United States Patent Office 2,971,979
Patented Feb. 14, 1961

2,971,979

DICARBAMATES OF 1-ALKYL-2,3 ALKYLENE-1,3-DIOLS

Werner Meiser, Stefan Breitner, Wolfgang Wirth, and Horst Kreiskott, all % Farbenfabriken Bayer A.G., Wuppertal-Elberfeld, Germany No Drawing. Filed Nov. 25, 1958, Ser. No. 776,196

Claims priority, application Germany Dec. 24, 1957

5 Claims. (Cl. 260—482)

This invention relates, in general, to novel organic chemical compounds. More particularly, the invention contemplates the provision of certain cyclic dicarbamates which are found to possess pharmacological activity as central nervous system depressants within warm-blooded animals.

The compound 2-methyl-2-n-propyl-1,3-propanediol dicarbamate of the formula:

(I)

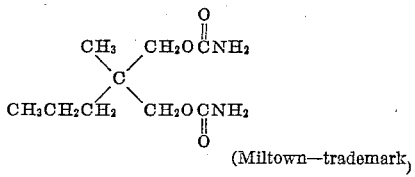

(Miltown—trademark)

is representative of a group of known compounds referred to collectively as "tranquilizers" in the literature, in the sense that they exhibit selective action on subcortical centers and particularly the thalamus. The pharmacological activity or effect of such tranquilizers consists of a sedative and a hypnotic component; the measure of effectiveness of a true tranquilizer being based, at least in part, on the fact that the sedative effect should considerably outweigh the hypnotic effect. With reference to the foregoing compound, however, the hypnotic-action component exhibits significant strength, as witnessed by reported cases in which patients have committed rash and uncontrolled acts while under the influence of this drug.

The present invention is based, in part, on our discovery of a new group of compounds which exhibit good sedative action with virtually no hypnotic effect when employed in the capacity of tranquilizing agents for warm-blooded animals. As distinguished from the primary diol derivative of Formula I above, the compounds of the invention are derived from secondary diols, and consist of the dicarbamates of 1-alkyl-2,3-alkylenepropane-1,3-diols represented by the formula:

(II)

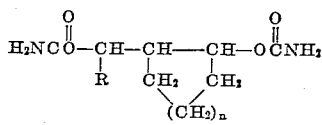

wherein R is an alkyl radical of not more than seven (7) carbon atoms chain-length, and n is an integer of from 1 to 3, inclusive.

The compounds may be derived from the corresponding diols by application of conventional techniques. For example, the diols can be reacted with phosgene in the presence of a base and within an inert organic solvent system to form dichlorocarbonic esters, which may be reacted, in turn, with ammonia to yield the dicarbamates. Suitable organic solvents for use in this synthesis include benzene, toluene, chloroform, ethylene chloride, and acetone, among others. The base employed may be any of dimethylaniline, pyridine, trimethylamine, sodium hydroxide, sodium bicarbonate, and the like.

Alternatively, the diols may be reacted with phenyl chloroformate, possibly in the presence of an organic base, to form diol diphenylcarbonates, which are then reacted with ammonia, with liberation of phenol, to yield the desired dicarbamates. In addition, the diols may be reacted with urea chloride in an inert organic solvent, also possibly in the presence of a base, to form the dicarbamate; or they may be fused with urea or urea salts (with or without a catalyst) at an elevated temperature, ammonia being liberated or an ammonia salt being formed, with resulting formation of the dicarbamate. Further, the diols can be reacted with cyanic acid in an inert organic solvent, or they may be transesterified with alkyl urethans at elevated temperatures in the presence of catalysts such as aluminium propylate.

The diols used in the foregoing syntheses can be readily obtained from cyclopentanone, cyclohexanone, or cycloheptanone by condensation with aldehydes and reduction of the keto group.

In general, the compounds of the invention dissolve relatively sparingly in water. They are particularly well tolerated by all conventional routes of administration. By way of illustration, the lethal dose ($LD_{50}$) for the rat and the hamster (Mesocricetus auratus) is greater than 5000 mg./kg., as compared to an $LD_{50}$ within the range 600-700 mg./kg. for the known compound of Formula I.

The active dose of the new compounds of this invention is between 1 and 20 mg./kg. The activity was tested according to the method described by Wirth et al. in Arch. Int. Pharmakodyn. 115 (1958), page 7. This test is especially suited for determining the pure tranquilizing activity.

To facilitate a fuller and more complete understanding of the subject matter of our invention and of how the novel compounds thereof may be produced, specific procedures for the production of several of the compounds will now be described, but it should be understood that such examples are offered for purposes of illustration, only, and are not to be construed as imposing any limitations on the scope of the subjoined claims:

EXAMPLE I

Preparation of the dicarbamate of 2-(α-hydroxyethyl)-1-cyclohexanol, as represented by the formula:

(III)

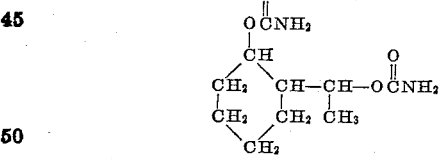

A solution of 144 grams of 2-(α-hydroxyethyl)-1-cyclohexanol, 1000 milliliters of acetone, and 242 grams of dimethylaniline was instilled into 970 grams of a freshly prepared solution (21%) of phosgene in acetone while cooling with ice. The mixture was stirred at room temperature for 4 hours and subsequently at 40–45° C. for another 4–5 hours. The acetone was then distilled off in vacuo, and the residue taken up with methylene chloride and mixed with ice and hydrochloric acid. Following separation of the layers, an extraction was made with water, and the material dried over calcium chloride. Ammonia gas was then introduced into the methylene chloride solution for several hours. The thick crystal paste produced was filtered off by suction and washed. It was then pasted-up with 500 cubic centimeters of water for removal of ammonium chloride, filtered off, and washed. Recrystallization from alcohol yielded the white crystals of the desired dicarbamate of melting point 223° C.

The same compound was produced by saturating 2-(α-hydroxyethyl)-1-cyclohexanol in benzene solution with gaseous cyanic acid, and by introducing cyanogen chloride into 2 moles of the diol.

In a further alternate synthesis, 14.4 grams of 2-(α-hydroxyethyl)-1-cyclohexanol was fused, while stirring, with 19 grams of ethyl urethan and 1 gram of aluminum isopropylate at 160–170° C. during 4 hours. Cooling was followed by repeated digestion with water and ensuing recrystallization from alcohol to yield the desired dicarbamate of the same melting point.

EXAMPLE II

*Preparation of the dicarbamate of 2-(α-hydroxybutyl)-1-cyclohexanol, as represented by the formula:*

(IV)

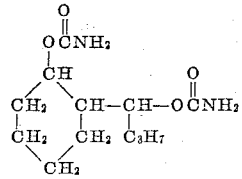

Seventeen (17) grams of 2-(α-hydroxybutyl)-1-cyclohexanol, 24.2 grams of dimethylaniline, and 100 cubic centimeters of absolute benzene were gradually instilled, while cooling with ice, into 100 grams of a 20 percent phosgene solution in benzene. The resulting mixture was stirred at room temperature for two hours and at 40–45° C. for another 4 hours. After addition of ice and dilute HCl, the layers were separated, and the benzene was again extracted with water. After drying over sodium sulfate, ammonia was introduced into the solution for several hours while it was cooled with ice. The resulting crystal paste was filtered off by suction and washed. It was then suspended in 50 cubic centimeters of water, and filtered and washed again. Recrystallization from a large volume of methanol yielded the desired dicarbamate of melting point 225° C.

The same compound was also obtained by heating seventeen (17) grams of 2-(α-hydroxybutyl)-1-cyclohexanol with 40 grams of urea at 150–160° C. until the evolution of ammonia ceased.

In a further alternate synthesis, 17.2 grams of 2-(α-hydroxybutyl)-1-cyclohexanol was dissolved in 100 cubic centimeters of absolute benzene and, while cooled with ice, gradually mixed with 16 grams of urea chloride in 20 cubic centimeters of absolute benzene, followed by stirring at room temperature for several hours. The resulting precipitate was filtered off by suction, pasted-up with water, and washed. Recrystallization from a large quantity of methanol again yielded the desired dicarbamate of melting point 225° C.

EXAMPLE III

*Preparation of the dicarbamate of 2-(α-hydroxyethyl)-1-cyclopentanol, as represented by the formula:*

(V)

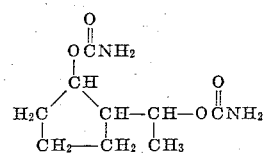

Thirteen (13) grams of 2-(α-hydroxyethyl)-1-cyclopentanol was gradually instilled with 24.2 grams of dimethylaniline and 100 cubic centimeters of absolute benzene, into 100 grams of a 20 percent phosgene solution in benzene, while cooling with ice. By application of the same procedure described in Example II, the desired dicarbamate was obtained. It has a melting point of 220° C.

EXAMPLE IV

*Preparation of the dicarbamate of 2-(α-hydroxy-β-ethylhexyl)-1-cyclohexanol, as represented by the formula:*

(VI)

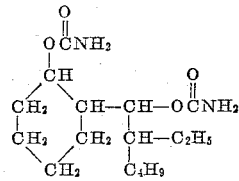

Twenty-eight and eight-tenths (28.8) grams of 2-(α-hydroxy-β-ethylhexyl)-1-cyclohexanol was mixed with 24.2 grams of dimethylaniline and 100 cubic centimeters of acetone and, while cooling with ice, instilled into 97 grams of a freshly prepared phosgene (21%) solution in acetone. The mixture was stirred at room temperature for 2 hours and at 40–45° C. for another 4 hours. The acetone was distilled off in vacuo, and the residue was absorbed in methylene chloride and mixed with ice and hydrochloric acid. After separation of the layers, an extraction with water was carried out, and the recovered material dried over calcium chloride. Ammonia gas was then introduced into the methylene chloride solution during several hours. The crystal crop was filtered off and washed well with water to remove the ammonium chloride. Recrystallization from alcohol yielded white crystals of the desired dicarbamate.

These crystals were boiled in ethyl acetate to remove residual starting material. The purified dicarbamate melted at 193° C.

We claim:

1. A chemical compound represented by the formula:

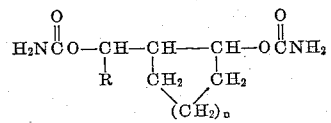

wherein R is an alkyl radical of from 1–7 carbon atoms chain-length, and $n$ is an integer of from 1 to 3, inclusive.

2. The dicarbamate of 2-(α-hydroxyethyl)-1-cyclohexanol.

3. The dicarbamate of 2-(α-hydroxybutyl)-1-cyclohexanol.

4. The dicarbamate of 2-(α-hydroxyethyl)-1-cyclopentanol.

5. The dicarbamate of 2-(α-hydroxy-β-ethylhexyl)-1-cyclohexanol.

References Cited in the file of this patent

Clarke et al.: J. Chem. Soc. (London), pages 2108–15 (1950).

Ludwig et al.: J.A.C.S., volume 75, pages 5779–80 (1951).